United States Patent [19]

Yamaoka et al.

[11] Patent Number: 4,905,167

[45] Date of Patent: Feb. 27, 1990

[54] IMAGE PROCESSING SYSTEM INTERFACING WITH DIFFERENT MONITORS

[75] Inventors: Shigemitsu Yamaoka; Kenji Iwamoto, both of Hamamatsu, Japan

[73] Assignee: Yamaha Corporation, Shizuoka, Japan

[21] Appl. No.: 131,213

[22] Filed: Dec. 10, 1987

[30] Foreign Application Priority Data

Dec. 11, 1986 [JP] Japan ............................... 61-295228

[51] Int. Cl.[4] ............................................. G06F 3/153

[52] U.S. Cl. .................................... 364/521; 358/140; 358/903

[58] Field of Search ......................... 358/11, 140, 903; 364/200 MS File, 900 MS File, 518, 521, 140, 903, 11; 340/701, 703

[56] References Cited

U.S. PATENT DOCUMENTS

| | | | |
|---|---|---|---|
| 4,403,303 | 9/1983 | Howes et al. | 364/900 |
| 4,631,692 | 12/1986 | Broedner | 364/518 |
| 4,823,120 | 4/1989 | Thompson et al. | 340/703 |

*Primary Examiner*—Gary V. Harkcom
*Assistant Examiner*—Raymond J. Bayerl
*Attorney, Agent, or Firm*—Scully, Scott, Murphy & Presser

[57] ABSTRACT

An image processing apparatus designed to interface with different monitors which processes image data read from a video random access memory (VRAM) so as to display an image corresponding to the image data on a screen of a display unit under a control of a central processing unit (CPU). The image processing apparatus at least provides a plurality of registers and a memory for storing several kinds of reference data for several kinds of predetermined modes. When one mode is selected from the predetermined modes, one of a color display and a monochromatic display is selectively performed on a screen of one of a color monitor and a monochromatic monitor or a screen of one of moniters each having different standard. The reference data corresponding to the selected mode are read from the memory and stored in the registers. When the selected mode is changed, reference data stored in requisite registers selected by newly selected mode are automatically rewritten by the reference data selected by the newly selected mode without exchanging programs of the CPU.

7 Claims, 3 Drawing Sheets

IMAGE PROCESSING SYSTEM INTERFACING WITH DIFFERENT MONITORS

BACKGROUND OF THE INVENTION

1. Field of the Invention

The present invention generally relates to an image processing system or apparatus designed to interface with different monitors apparatus, and more particularly to an image processing apparatus which processes image data to thereby display an image on screens of a color display unit and a monochromatic display unit such as a CRT display unit.

2. Prior Art

Conventionally, the image processing apparatus (so called CRT) is well known for displaying a certain image on the screen of CRT display unit under a control of a central processing unit (CPU). In such image processing apparatus, predetermined registers pre-store a timing for generating a horizontal or vertical synchronizing signal, a frequency of a dot clock pulse and a start address for reading data from a video random access memory (VRAM). Thus, the image processing apparatus performs a display control in response to the data stored in these registers.

Meanwhile, the image processing apparatus must use different initialization data such as data representative of the timing for generating synchronizing signals, data representative of the frequency of the dot clock pulse and other data based on kinds of connected monitor. More specifically, the above initialization data must be different for a color monitor and a monochromatic monitor. Such difference of initialization data is caused by a difference between general standards of the color monitor and the monochromatic monitor.

In the case where programs of the CPU are written for the color monitor and such programs are used for controlling the image processing apparatus to thereby display the image on the screen of the monochromatic monitor, data stored in the registers of the image processing apparatus must be set for the color display because of an initialization process. In such case, the conventional image processing apparatus suffers several kinds of disadvantages due to a difference between programs for the color display and the monochromatic display.

In the above-mentioned case, the programs must be rewritten so as to rewrite the data values of the registers for the color monitor to other data values of the registers for the monochromatic monitor. More specifically, the programs having the same function must be written independently for use in the color monitor and the monochromatic monitor. Hence, the conventional image processing apparatus suffers disadvantages in that a design of software must be troublesome and the designed programs can not be used generally. The above disadvantages (or problems) must be dealt with when the conventional apparatus is used for both of the color monitor and the monochromatic monitor. In addition, such disadvantages must be also dealt with when the conventional apparatus is used for color monitors having different standards and when the conventional apparatus is used for monochromatic monitors having different standards.

SUMMARY OF THE INVENTION

It is therefore a primary object of the invention to provide an image processing apparatus which can apply the programs written for the color monitor to the monochromatic monitor without any disadvantages.

It is another object of the invention to provide an image processing apparatus which can apply the programs for the monitor having a certain standard to the monitor having another standard.

In a first aspect of the invention, there is provided an image processing apparatus comprising: (a) memory means for storing the reference data used in the case where the image processing apparatus uses a monitor other than a monitor to be originally used; and (b) register writing control means for sequentially selecting registers the data of which must be converted or changed from a plurality of registers when a predetermined conversion signal is supplied thereto, the register writing control means reading requisite reference data from the memory means to thereby write the requisite reference data in the selected registers.

In a second aspect of the invention, there is provided an image processing apparatus comprising: (a) memory means for storing the reference data used in the case where the image processing apparatus uses a monitor other than a monitor to be originally used; (b) register writing control means for selecting registers the data of which must be converted or changed from a plurality of registers when a predetermined conversion start signal is supplied thereto, the register writing control means reading requisite reference data from the memory means to thereby write the requisite reference data in the selected registers; (c) pointer means for being written with register designating data for selecting the registers; and (d) protection decoder means for inhibiting a writing operation from being performed on the registers other than the requisite registers based on the register designating data.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF THE PREFERRED EMBODIMENT

Figure 1:
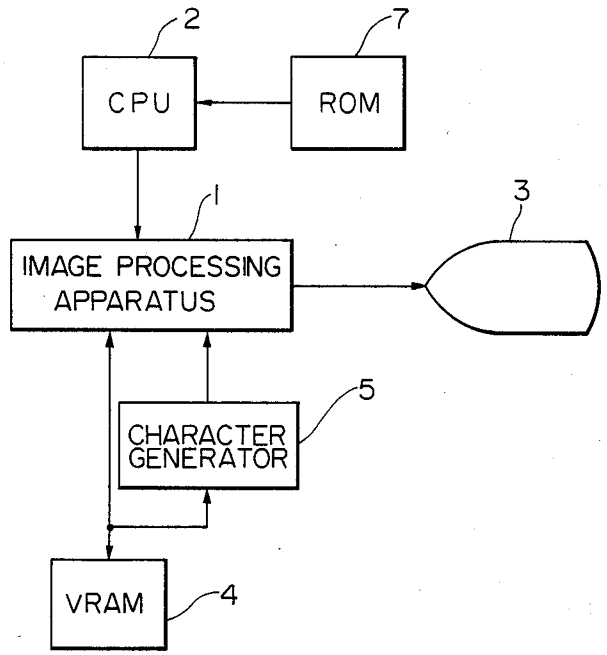
FIG. 1 is a block diagram showing a whole constitution of an image display system employing an embodiment of the image processing apparatus according to the present invention.

Referring now to the drawings, FIG. 1 is a block diagram showing a whole constitution of an image display system employing an embodiment of the image processing apparatus according to the present invention.

In FIG. 1, an image processing apparatus 1 displays an image on a screen of a CRT display unit 3 under a control of a CPU 2. In addition, a VRAM 4 stores dot data and character codes for an image display. Further, a character generator 5 is provided for displaying characters, and the character generator 5 reads out character patterns designated by the character codes stored in the VRAM 4. Furthermore, a read only memory (ROM) 7 pre-stores the programs used for the CPU 2.

[A] CONSTITUTION OF EMBODIMENT

Figure 2A:
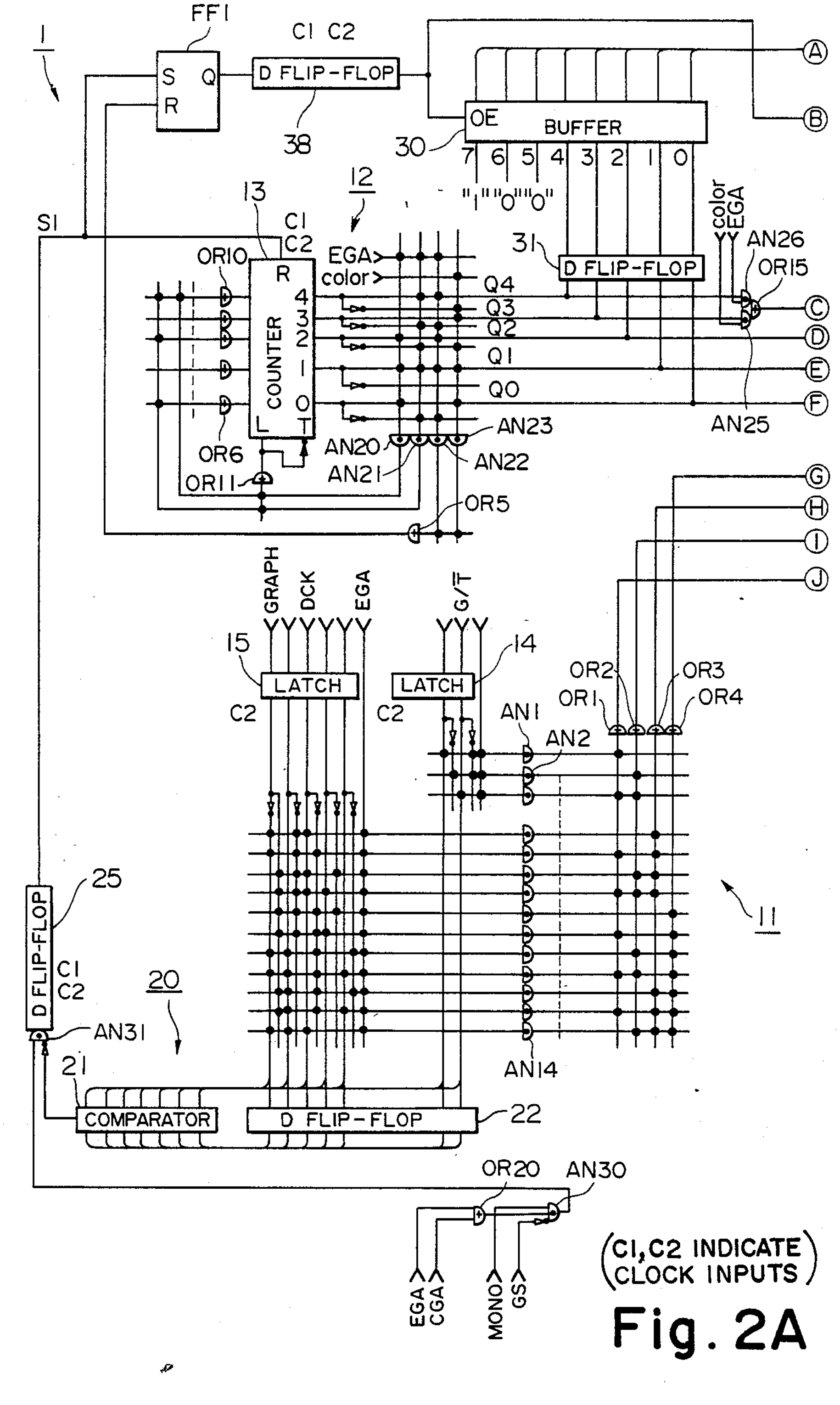
FIGS. 2A and 2B are circuit diagrams showing an essential portion of the image processing apparatus shown in FIG. 1.
Figure 2B:
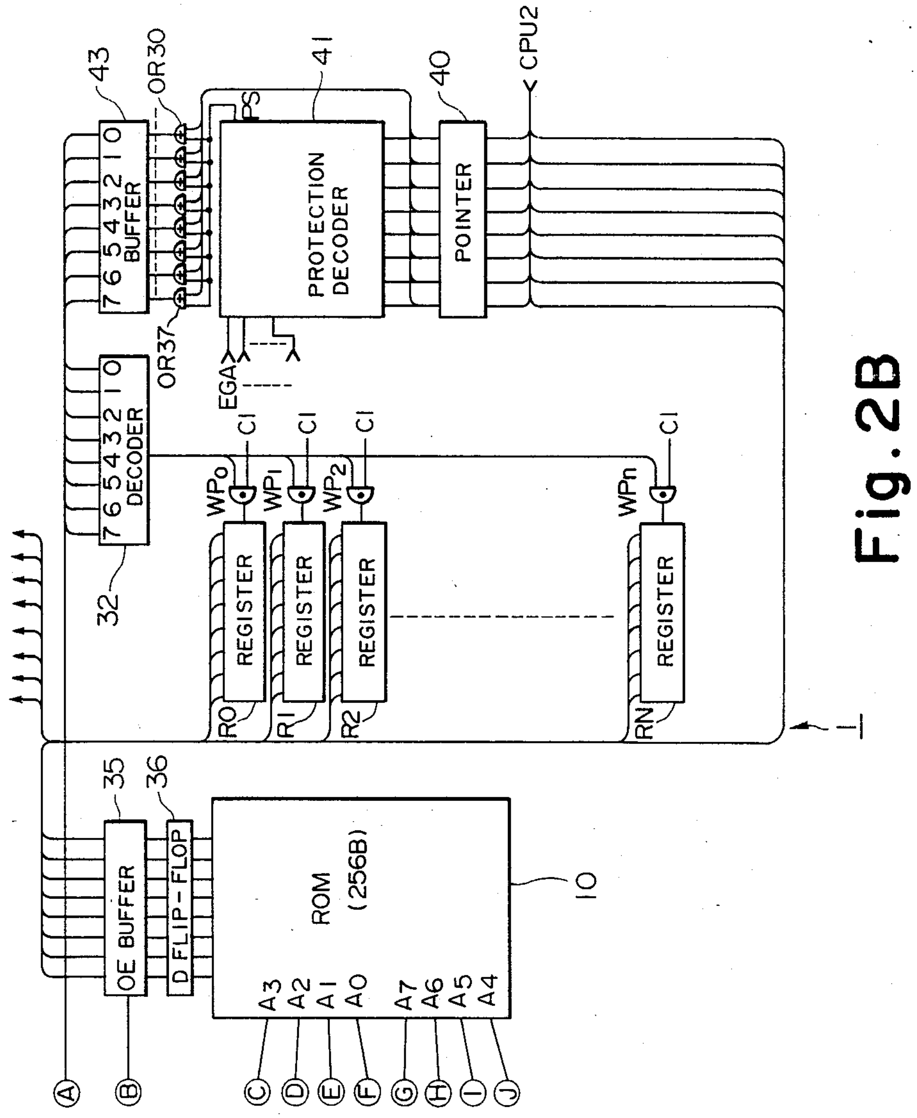

Next, description will be given with respect to an essential portion of the image apparatus 1 in conjunction with FIGS. 2A and 2B. In FIGS. 2A and 2B, the clock symbols C1 and/or C2 adjacent to a component indicate that the clock signals are inputs thereto.

In FIG. 2B, 10 designates a ROM for storing several kinds of set data (or basic data) for registers (which will be described later) when a monochromatic display unit is applied to the system shown in FIG. 1. Upper addresses $A_7$ to $A_4$ of the ROM 10 are determined by an upper address selecting section 11 (shown in FIG. 2A), and lower addresses thereof are determined by a lower address selecting section 12 (shown in FIG. 2A).

The upper address selecting section 11 is constituted by AND gates AN1 to AN14, OR gates OR1 to OR4, latch circuits 14, 15 and inverters (having no numerals). This upper address selecting section 11 is supplied with mode signals GRAPH, DCK, EGA and G/T̄each designating a specific mode. The OR gates OR1 to OR4 respectively output the upper addresses $A_7$ to $A_4$ corresponding to the mode selected by the mode signals. The latch circuits 14 and 15 operate based on a clock signal C2. More specifically, each of the latch circuits 14 and 15 transmits input data from an input terminal thereof to an output terminal thereof when the clock signal C2 has a "1" level, and each latch circuit latches the input data when the level of the clock signal C2 falls down.

The input terminals of the AND gates AN1 to AN14 are arranged in a matrix as shown in FIG. 2A. Based on a kind of the mode signals supplied to the input terminals of the AND gates AN1 to AN14 or based on a combination of the mode signals supplied thereto, one or more than two of the AND gates AN1 to AN14 output signals each having the "1" level (hereinafter, referred to as "1" signals). Each of OR gates OR1 to OR4 outputs the "1" signal when the "1" signal is supplied thereto, and each of OR gates OR1 to OR4 outputs a signal having a "0" level (hereinafter, referred to as a "0" signal) when the "1" signal is not supplied thereto. Thus, four output signals of the OR gates OR1 to OR4 constitute upper address data of four bits.

Meanwhile, the lower address selecting section 12 is constituted by a counter 13 of five bits, AND gates AN20 to AN23, OR gates OR5 to OR11 and inverters (having no numerals). The counter 13 performs a counting operation based on clock signals C1 and C2. The "1" signal supplied to a reset terminal R of the counter 13 resets the counter 13, and the "1" signal supplied to an enable terminal T of the counter 13 sets the counter 13 at an enable state. In addition, the counter 13 loads output signals of the OR gates OR6 to OR10 as preset data of five bits when the "1" signal is supplied to a load terminal L of the counter 13. In this case, both of the clock signals C1 and C2 have the same predetermined cycle, and a phase of the clock signal C1 is set inverse to a phase of the clock signal C2. The counter 13 counts up a count value thereof at each leading edge timing of the clock signal C2.

The above counter 13 counts up the count value represented by count data of five bits by selectively varying levels of output signals $Q_4$ to $Q_0$ thereof. The output signal $Q_4$ represents the most significant bit of the count data, and the output signal $Q_0$ represents the least significant bit of the count data. For example, when the count value reaches at "7" (represented by the count data of "00111"), the levels of the output signals $Q_4$ and $Q_3$ are both equal to the "0" level and the levels of other output signals $Q_2$ to $Q_0$ are all equal to the "1" level. Hereinafter, such count data of "00111" will be referred to as count data of $(07)_H$. In general, the first number "a" of data $(ab)_H$ represents the value of the most significant bit of the data of five bits, and the latter number "b" of the data $(ab)_H$ represents the value of data of four bits other than the most significant bit.

The AND gate AN20 outputs the "1" signal when output signals $Q_4$ to $Q_0$ of the counter 13 represent the count data of $(07)_H$ and a signal EGA has the "1" level. The AND gate AN21 outputs the "1" signal when the counter 13 outputs count data of $(12)_H$ (i.e., count data of "10010") and the signal EGA has the "1" level. The output signal of the AND gate AN20 is supplied to input terminals of the OR gates OR11 and OR10 respectively. In addition, the output signal of the AND gate AN21 is supplied to input terminals of the OR gates OR11, OR6, OR8 and OR10. As a result, count data of $(10)_H$ (i.e., count data of "10000") is preset to the counter 13 when the count data of the counter 13 reach at the count data of $(07)_H$. On the other hand, count data of $(15)_H$ is preset to the counter 13 when the count data of the counter 13 reach at the count data of $(12)_H$.

In addition, the AND gate AN22 outputs the "1" signal when the counter 13 outputs the count data of $(16)_H$ (i.e., the count data of "10110") and the signal EGA has the "1" level. Further, the AND gate AN23 outputs the "1" signal when the counter 13 outputs count data of $(0B)_H$ (i.e., count data of "01011") and a signal "color" has the "1" level. Both of output signals of the AND gates AN22 and AN23 are supplied to the OR gate OR5, and an output signal of the OR gate OR5 is supplied to a reset terminal of a flip-flop FF1. The output signals $Q_0$ to $Q_2$ are supplied to the ROM 10 (shown in FIG. 2B) as address signals $A_0$ to $A_2$. On the other hand, the output signals $Q_3$ and $Q_4$ are supplied to input terminals of an 0R gate OR15 via AND gates AN25 and AN26 respectively, and an output signal of the OR gate OR15 is supplied to the ROM 10 as an address signal $A_3$. More specifically, the output signal $Q_3$ becomes identical to the address signal $A_3$ when the signal "color" has the "1" level so that the AND gate AN25 is subjected to an open state. On the contrary, the output signal $Q_4$ becomes identical to the address signal $A_3$ when the signal EGA has the "1" level so that the AND gate AN26 is subjected to the open state.

Next, a mode selection detecting section 20 (shown in FIG. 2A) is constituted by a comparator 21 and a D flip-flop 22. Input terminals of the D flip-flop 22 and first input terminals of the comparator 21 are supplied with the mode signals GRAPH, DCK and G/T̄ and other signals. Second input terminals of the comparator 21 are supplied with the delayed mode signals from the D flip-flop 22. In the case where there are no changes in the mode signals supplied to the comparator 21 and the D flip-flop 22, the levels of the mode signals supplied to the first input terminals of the comparator 21 are respectively identical to the levels of the delayed mode signals supplied to the second input terminals of the comparator 21, hence, the comparator 21 outputs a coincidence signal (i.e., the "1" signal). On the contrary, in the case where there are changes in the mode signals, the levels of the mode signals are not identical to the levels of the delayed mode signals, hence, the comparator 21 outputs a non-coincidence signal (i.e., the "0" signal). Such output signal of the comparator 21 is supplied to a first input terminal of an AND gate AN31 via an inverter.

The AND gate AN31 is controlled to be opened or closed based on a logical operation result of an AND gate AN30 and an OR gate OR20. This AND gate AN31 is subjected to the open state when a mode signal MONO has the "1" level, a signal GS has the "0" level, plus one of signals EGA and CGA has the "1" level. In this case, the mode signal MONO turns to the "1" signal when the monochromatic monitor having a predetermined standard (e.g., an IBM standard) is used, and the level of the mode signal MONO is controlled by an external switch (not shown) and the like. Under the condition where the monochromatic monitor is used and the CPU 2 uses the programs for the color display, the signal GS is outputted when it is necessary to rewrite a content of data stored in a predetermined register within the image processing apparatus 1. In addition, the apparatus 1 is activated when the signal GS has the "0" level. Further, an external device (not shown) generates the signal GS by turning an external switch or by executing a software process and such external device outputs the signal GS to the apparatus 1.

In the case where the value "1" is obtained by the logical operation result of the OR gate OR20 and the AND gate AN30 so that the AND gate AN31 is subjected to the open state, the output signal of the AND gate AN31 is turned to the "1" signal at a timing when the comparator 21 outputs the non-coincidence signal (i.e., the "0" signal). At a next active timing of the clock signals C1 and C2, an output signal S1 of a D flip-flop 25 turns up to the "1" signal. This signal S1 is supplied to a reset terminal R of the counter 13 and a set terminal S of the flip-flop FF1.

Next, values "1", "0" and "0" are respectively supplied to 7-bit, 6-bit and 5-bit input terminals of a buffer 30. In addition, the output signals $Q_4$ to $Q_0$ of the counter 13 are supplied to 4-bit to 0-bit input terminals of the buffer 30 via a D flip-flop 31. The output signals of the buffer 30 (i.e., the data of eight bits outputted from the buffer 30) are supplied to a decoder 32 (shown in FIG. 2B) wherein the output signals of the buffer 30 are converted into write enable signals $WP_0$ to $WP_n$ (where n denotes an integral number) for registers R0 to RN (where N corresponds to the number n).

The above-mentioned registers R0 to RN are written by several kinds of data which are necessary for a display control. For example, registers used in a character mode include; a register written by data designating a total number of characters displayed on the screen of the display unit in one line period (including a retrace period); a register for designating a number of characters displayed in one line; a register written by data designating a start timing or an end timing of a horizontal blanking period; a register written by data designating a start timing or an end timing of a horizontal retrace period and other registers.

In the above case, the buffer 30 outputs register addresses for selecting requisite registers from registers R0 to RN based on a variation range of the input signals thereof, and such register addresses have a range between $(80)_H$ and $(9F)_H$ (i.e., a value range between data of "10000000" and data of "10011111").

Meanwhile, the data of eight bits read from the ROM 10 are supplied to a buffer 35 via a D flip-flop 36, and output signals of the buffer 35 are simultaneously supplied to data input terminals of each of the registers R0 to RN. The output signal from an output terminal Q of the flip-flop FF1 is passed through a D flip-flop 38 and is supplied to both of output enable terminals OE of the buffers 30 and 35.

Next, the CPU 2 outputs data for selecting one of the registers R0 to PN, and such data are supplied to a pointer 40. The output signals of the pointer 40 are supplied to a protection decoder 41, and each of such output signals is supplied to a first input terminal of each of OR gates OR30 to OR37. The output signals of the OR gates OR30 to OR37 are supplied to input terminals of a buffer 43, and output signals of the buffer 43 are supplied to input terminals of the decoder 32.

In the image processing apparatus having the above-mentioned constitution, the CPU 2 writes register designating data of eight bits in the pointer 40, and such register designating data are supplied to the decoder 32 via the 0R gates OR30 to OR37 and the buffer 43 in series. The decoder 32 converts the register designating data into the write enable signals $WP_0$ to $WP_n$. More specifically, the CPU 2 designates a requisite register by writing the register designating data in the pointer 40 so that the CPU 2 can perform a writing operation for the requisite register.

In the case where the data stored in the pointer 40 represent a protection of register, the protection decoder 41 turns up a level of a protection detecting signal PS to the "1" level so that the OR gates OR30 to OR37 output signals representative of data of $(FF)_H$ (i.e., data of "11111111"). Since several modes select different registers to be protected, the protection decoder 41 refers to the mode signals EGA etc. and outputs the protection detecting signal PS when the data stored in the pointer 40 designates a predetermined write inhibiting register.

This protection detecting signal PS is supplied to second input terminals of the OR gates OR30 to OR37. As a result, when the protection decoder 41 outputs the protection detecting signal PS, the OR gates OR30 to OR37 simultaneously output the "1" signals, regardless of the contents of the data stored in the pointer 40. Therefore, the data stored in the buffer 43 is identical to data of $(FF)_H$, and the decoder 32 decodes the data of $(FF)_H$ so as to select the register corresponding to the decoded result thereof. However, the register addresses correspond to data of $(80)_H$ to data of $(9F)_H$ as described before, hence, there is no register corresponding to the data $(FF)_H$. In other words, the writing operation is not performed on the registers R0 to RN when the data of $(FF)_H$ are supplied to the decoder 32. Thus, when the CPU 2 starts to rewrite the content of data stored in a predetermined register to be protected, the protection decoder 41 inhibits the writing operation from being performed on the predetermined register.

[B] OPERATION OF EMBODIMENT

Next, description will be given with respect to operations of the present embodiment in the case where the monochromatic monitor having a predetermined standard (e.g., the IBM standard) is used and the CPU 2 uses the programs for the color display.

In this case, the mode signal MONO is set to the "1" signal, the signal GS is set to the "0" signal, and one of the signals EGA and CGA is set to the "1" signal. As a result, the AND gate AN30 outputs the "1" signal so that the AND gate AN31 is subjected to the open state. When there are any changes in the mode signals, the mode selection detecting section 20 detects such changes of the mode signals so that the comparator 21 outputs the "0" signal. Therefore, the output signal of the AND gate AN31 turns up to the "1" signal, and this "1" signal is stored in the D flip-flop 25 wherein the level of the output signal S1 thereof turns to the "1" level.

At this time, the counter 13 is reset so that the output levels of the AND gates AN20 and AN21 fall down to the "0" levels. Hence, the output signal of the OR gate OR11 turns down to the "0" signal, and such "0" signal is inverted by the inverter and the "1" signal is supplied to the enable terminal T of the counter 13, whereby the counter 13 counts up the count value thereof based on the clock signal C2. As described before, the output signals $Q_0$ to $Q_4$ of the counter 13 are supplied to the ROM 10 as the address data $A_0$ to $A_3$ On the other hand, the address selecting section 11 generates address data $A_7$ to $A_4$ in response to a combination of the mode signals, and such address data $A_7$ to $A_4$ are supplied to upper address input terminals of the ROM 10.

(1) FIRST CASE

Next, description will be given with respect to a first case where the signal "color" has the "1" level and the signal EGA has the "0" level. In this first case, the output signal $Q_3$ of the counter 13 becomes identical to the address data $A_3$ and another output signal $Q_4$ thereof is ignored. In such mode, the counter 13 outputs data of lower four bits (i.e., the output signals $Q_0$ to $Q_3$) as the address data $A_0$ to $A_3$. Due to the address data $A_0$ to $A_3$, the access is given to the ROM 10 to thereby read out certain data therefrom. Such certain data are supplied to the buffer 35 via the D flip-flop 36. In addition, the count data of five bits from the counter 13 are supplied to input terminals corresponding to lower five bits of the buffer 30 via the D flip-flop 31.

Meanwhile, the flip-flop FF1 is set and the "1" signal is outputted therefrom when the output signal S1 of the D flip-flop 25 turns up to the "1" signal. This "1" signal outputted from the flip-flop FF1 is supplied to the output enable terminals OE of the buffer 30 and 35 via the D flip-flop 38, whereby the buffer 30 and 35 are subjected to the open states. Therefore, the count data outputted from the counter 13 are supplied to the decoder 32 via the buffer 30, and the data read from the ROM 10 are supplied to the registers R0 to RN via the D flip-flop 36 and the buffer 35 in series. In this case, the register selected by the count data of the counter 13 corresponds to an address of data to be written in the selected register. Due to a count-up operation of the counter 13, the register and the data to be written in such register are both simultaneously selected.

Thereafter, when the counter 13 outputs the count data of $(0B)_H$ (i.e., the count data of "01011"), the AND gate AN23 outputs the "1" signal, hence, the OR gate OR5 outputs the "1" signal by which the flip-flop FF1 is reset. At this time, the buffers 30 and 35 are both closed, whereby a selecting process and a data writing process of the registers R0 to RN are completed. In the present mode, while the count value of the counter 13 varies from data value of $(00)_H$ to data value of $(0B)_H$, the writing process is performed on the registers R0 to RN.

(2) SECOND CASE

Next, description will be given with respect to a second case where the signal "color" has the "0" level and the signal EGA has the "1" level. In this second case, the output signal $Q_4$ of the counter 13 becomes identical to the address data $A_3$ and another output signal $Q_3$ is ignored. When the count value of the counter 13 becomes identical to a data value of $(X7)_H$ (i.e., the 4-bit of the count data is identified as a "don't care bit" and other 3-bit to 0-bit of the count data represent a value "7"), the AND gate AN20 outputs the "1" signal. As a result, the OR gate OR11 outputs the "1" signal so that the counter 13 starts to perform a loading operation. Based on such loading operation, the data value of $(10)_H$ is preset to the counter 13. Similarly, when the count value becomes identical to the data value of $(12)_H$, the AND gate AN21 outputs the "1" signal, hence, the data value of $(15)_H$ is preset to the counter 13. Further, when the count value becomes identical to the data value of $(16)_H$, the AND gate AN22 outputs the "1" signal, hence, the OR gate OR5 outputs the "1" signal and the flip-flop FF1 is reset.

In the present mode, the count value varies discontinuously: $(00)_H$ to $(07)_H$; $(10)_H$ to $(12)_H$; and $(15)_H$ to $(16)_H$. Therefore, the selecting process of the registers R0 to RN is performed in response to the above count value discontinuously. In other words, such process is identified as a process for selectively extracting a requitite register which needs the writing process in the present mode. Lastly, when the count value reaches at the data value of $(16)_H$, the flip-flop FF1 is reset, hence, the buffers 30 and 35 are both closed so that the writing process for the registers R0 to RN are stopped.

As described heretofore, predetermined data are written in the registers R0 to RN for storing several kinds of data required for the image display process by use of a hardware (not a software), and the register to be written by the data will be automatically selected in response to each mode. Accordingly, it is possible to perform a desirable display control by use of the monochromatic monitor even when the CPU 2 uses the programs for the color display. In addition, there is no need for writing programs independently for the color monitor and the monochromatic monitor. Hence, the software design does not become complicated, and it is possible to obtain the programs having a high generalization.

According to the present embodiment, the protection decoder 41 inhibits the writing process from being performed on the register to be protected in the case where the predetermined data are written in one of the registers R0 to RN in the writing process of the CPU 2. Therefore, it is possible to perform a stable display process without rewriting the data properly set in the register in the writing process of the CPU 2.

This invention may be practiced or embodied in still other ways without departing from the spirit or essential character thereof. Therefore, the preferred embodiment described herein is illustrative and not restrictive, the scope of the invention being indicated by the appended claims, and all variations which come within the meaning of the claims are intended to be embraced therein.

What is claimed is:

1. An image processing apparatus designed to interface with different monitors and having a plurality of registers for storing reference data for a display control, said image processing apparatus performing an image display based upon reference data stored in said registers under control of a central processing unit, said image processing apparatus comprising:

(a) memory means for storing a plurality of sets of reference data used for a plurality of different monitors in the event said image processing apparatus uses an alternative monitor other than an original monitor to be originally used; and (b) register writing control means, including, (i) mode selection detecting means for detecting whether a preset mode signal is identical to a mode signal which is set based on the type of monitor to be utilized, and said mode selection detecting means detecting a mode selection timing when said mode signal indicates a different selected mode and outputting a predetermined conversion start signal upon detection of said mode selection timing, and said register writing control means being responsive to said mode selection detecting means for selecting particular selected registers from said plurality of registers, the data in which is to be changed when said predetermined conversion start signal is supplied thereto, to cause said register writing control means to read the requisite reference data from said memory means and write the requisite reference data in the selected registers, (ii) a first address setting means for setting a first address for said memory means, said first address having a specific value corresponding to the selected mode, (iii) a second address setting means for sequentially varying a value of a second address for said memory means in response to the selected mode after said mode selection timing, (iv) register control means for generating write enable signals, each corresponding to each of said plurality of registers, said write enable signals having values which are varied in accordance with the selected mode, and said write enable signals sequentially selecting said selected registers each of which is write said reference data read from said memory means based upon said first and second addresses, and (v) variation range setting means for setting a variation range of the value of said second address in response to the selected mode, said variation range setting means stopping reading out of said reference data from said memory means when the value of said second address reaches a last value within said variation range.

2. An image processing apparatus according to claim 1, wherein said second address setting means comprises:

(a) counter means for sequentially counting up a count value thereof representative of the value of said second address after each mode selection timing; and (b) means for loading preset values to said counter means each time said count value reaches each of predetermined values, said preset values being predetermined in accordance with each mode.

3. An image processing apparatus according to claim 1, wherein said memory means comprises a read only memory (ROM).

4. An image processing apparatus designed to interface with different monitors and having a plurality of registers for storing reference data for a display control, said image processing apparatus performing an image display based upon said reference data stored in said registers under control of a central processing unit, said image processing apparatus comprising:

(a) memory means for storing a plurality of sets of reference data used for a plurality of different monitors in the event said image processing apparatus uses an alternative monitor other than an original monitor to be originally used;

(b) register writing control means, including mode selection detecting means for detecting whether a preset mode signal is identical to a mode signal which is set based upon the type of monitor to be utilized, and said register writing control means being responsive to said mode selection detecting means for selecting particular selected registers from said plurality of registers, the data in which is to be changed when a predetermined conversion signal is supplied thereto, to cause said register writing control means to read the requisite reference data from said memory means and write the requisite reference data in the selected registers;

(c) pointer means for being written with register designating data for selecting said selected registers; and (d) protection decoder means for inhibiting a writing operation from being performed on the registers other than said selected registers based upon said register designating data.

5. An image processing apparatus according to claim 4, wherein said memory means comprises a read only memory (ROM).

6. An image processing apparatus according to claim 4, said register writing control means further comprising:

(a) said mode selection detecting means detecting a mode selection timing when said mode signal indicates a different selected mode, and said predetermined conversion signal being outputted from said mode selection detecting means at said mode selection timing;

(b) a first address setting means for setting a first address for said memory means, said first address having a specific value corresponding to the selected mode;

(c) a second address setting means for sequentially varying a value of a second address for said memory means in response to the selected mode after said mode selection timing;

(d) register control means for generating write enable signals, each corresponding to each of said plurality of registers, said write enable signals having values which are varied in accordance with the selected mode and said register designating data, and said write enable signals sequentially selecting said selected registers, each of which is to write said reference data read from said memory means based on said first and second addresses; and (e) variation range setting means for setting a variation range of the value of said second address in response to the selected mode, said variation range setting means stopping reading out of said reference data from said memory means when the value of said second address reaches a last value within said variation range.

7. An image processing apparatus according to claim 6, wherein said second address setting means comprises:

(a) counter means for sequentially counting up a count value representative of the value of said second address after each mode selection timing; and (b) means for loading preset values to said counter means each time said count value reaches each of predetermined values, said preset values being predetermined in accordance with each mode.

* * * * *

UNITED STATES PATENT AND TRADEMARK OFFICE
CERTIFICATE OF CORRECTION

PATENT NO. : 4,905,167

DATED : February 27, 1990

INVENTOR(S) : Shigemitsu Yamaoka, et al.

It is certified that error appears in the above-identified patent and that said Letters Patent is hereby corrected as shown below:

Column 1, line 9: after "monitors" delete "apparatus"

Column 3, line 4: after "image" insert --processing--

Column 6, line 4: "PN" should read as --RN--

Column 9, line 46, Claim 2: after "claim" insert --1--

Signed and Sealed this

Sixteenth Day of July, 1991

*Attest:*

HARRY F. MANBECK, JR.

*Attesting Officer*

*Commissioner of Patents and Trademarks*